United States Patent
Abramov et al.

(10) Patent No.: US 10,440,404 B2
(45) Date of Patent: Oct. 8, 2019

(54) PROCESSING OF MULTIPLE MEDIA STREAMS

(71) Applicant: Sling Media, L.L.C., Foster City, CA (US)

(72) Inventors: Andrey Abramov, Foster City, CA (US); Dmitry Dimov, San Francisco, CA (US); Chih Jen Ken Lee, Albany, CA (US); Naga Venkata Gnana Meherkanth Vurimi, San Bruno, CA (US); Oleksandr Yegorov, San Francisco, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 15/367,745

(22) Filed: Dec. 2, 2016

(65) Prior Publication Data
US 2017/0164015 A1 Jun. 8, 2017

Related U.S. Application Data

(60) Provisional application No. 62/263,080, filed on Dec. 4, 2015.

(51) Int. Cl.
*H04N 21/234* (2011.01)
*H04N 21/482* (2011.01)
(Continued)

(52) U.S. Cl.
CPC ......... *H04N 21/234* (2013.01); *G11B 27/034* (2013.01); *G11B 27/28* (2013.01);
(Continued)

(58) Field of Classification Search
CPC .......... H04N 21/234; H04N 21/21805; H04N 21/2187; H04N 21/4383; H04N 21/44218;
(Continued)

(56) References Cited

U.S. PATENT DOCUMENTS 8,327,012 B1 12/2012 Nguyen et al.
9,590,941 B1 3/2017 Itoh et al.
(Continued)

FOREIGN PATENT DOCUMENTS

WO 2015109290 A1 7/2015

OTHER PUBLICATIONS

Non-Final Office Action for U.S. Appl. No. 15/367,738 dated Aug. 9, 2017 (11 pages).
(Continued)

*Primary Examiner* — Pankaj Kumar
*Assistant Examiner* — Alexander Boyd
(74) *Attorney, Agent, or Firm* — Kilpatrick Townsend & Stockton LLP

(57) ABSTRACT

A system includes a media studio including a processor and a memory. The memory stores instructions executable by the processor. The processor is programmed to receive data indicating a type of event to be recorded, receive one or more media input items from one or more respective media devices, and generate a media output item based at least in part on the one or more received media input items, and further based at least in part on the data indicating the type of event to be recorded and one or more respective locations of the one or more respective media devices.

15 Claims, 7 Drawing Sheets

(51) Int. Cl.

| | | |
|---|---|---|
| *H04N 21/442* | (2011.01) | |
| *H04N 21/466* | (2011.01) | |
| *H04N 21/414* | (2011.01) | |
| *H04N 21/438* | (2011.01) | |
| *G11B 27/034* | (2006.01) | |
| *G11B 27/28* | (2006.01) | |
| *H04N 5/222* | (2006.01) | |
| *H04N 5/247* | (2006.01) | |
| *H04N 5/262* | (2006.01) | |
| *H04N 21/218* | (2011.01) | |
| *H04N 21/2187* | (2011.01) | |
| *H04N 21/422* | (2011.01) | |
| *H04N 21/4223* | (2011.01) | |

(52) U.S. Cl.
CPC .............. *H04N 5/222* (2013.01); *H04N 5/247* (2013.01); *H04N 5/2624* (2013.01); *H04N 5/2625* (2013.01); *H04N 21/2187* (2013.01); *H04N 21/21805* (2013.01); *H04N 21/41407* (2013.01); *H04N 21/4223* (2013.01); *H04N 21/42201* (2013.01); *H04N 21/42202* (2013.01); *H04N 21/4383* (2013.01); *H04N 21/44218* (2013.01); *H04N 21/4667* (2013.01); *H04N 21/482* (2013.01)

(58) Field of Classification Search
CPC .............. H04N 21/4667; H04N 21/482; H04N 21/2365; H04N 21/41407; H04N 21/42201; H04N 21/42202; H04N 21/4223
See application file for complete search history.

(56) References Cited

U.S. PATENT DOCUMENTS

| | | | |
|---|---|---|---|
| 2004/0101212 A1 | 5/2004 | Fedorovskaya | |
| 2004/0156616 A1 | 8/2004 | Strub et al. | |
| 2004/0158865 A1 | 8/2004 | Kubler et al. | |
| 2008/0019669 A1 | 1/2008 | Girschick et al. | |
| 2008/0177994 A1 | 7/2008 | Mayer | |
| 2009/0087161 A1 | 4/2009 | Roberts et al. | |
| 2010/0026809 A1* | 2/2010 | Curry | H04N 5/222 348/157 |
| 2010/0123830 A1* | 5/2010 | Vunic | H04N 21/44008 348/700 |
| 2010/0156906 A1* | 6/2010 | Montgomery | G06T 15/205 345/427 |
| 2013/0205311 A1 | 8/2013 | Ramaswamy et al. | |
| 2013/0222601 A1 | 8/2013 | Engstrom et al. | |
| 2013/0259446 A1 | 10/2013 | Sathish | |
| 2013/0268955 A1 | 10/2013 | Conrad et al. | |
| 2013/0303248 A1 | 11/2013 | Williams et al. | |
| 2013/0343727 A1 | 12/2013 | Rav-Acha et al. | |
| 2014/0153902 A1 | 6/2014 | Pearson et al. | |
| 2015/0009364 A1 | 1/2015 | Anderson et al. | |
| 2015/0147049 A1* | 5/2015 | Eronen | H04N 21/23418 386/285 |
| 2015/0156529 A1 | 6/2015 | Peterson | |
| 2015/0229975 A1 | 8/2015 | Shaw et al. | |
| 2016/0142625 A1 | 5/2016 | Weksler et al. | |
| 2016/0189421 A1* | 6/2016 | Haimovitch-Yogev | G06T 15/205 345/626 |
| 2016/0225410 A1 | 8/2016 | Lee | |
| 2017/0061314 A1* | 3/2017 | Schnurr | H04N 21/23418 |
| 2017/0142480 A1* | 5/2017 | Gupta | H04N 21/21805 |

OTHER PUBLICATIONS

Non-Final Office Action for U.S. Appl. No. 15/367,741 dated Aug. 16, 2017 (11 pages).
International Search Report and Written Opinion of International Searching Authority in PCT/US2016/064780 dated Mar. 1, 2017 (12 pages).
Final Office Action dated Feb. 21, 2018 for U.S. Appl. No. 15/367,738 (26 pages).
Non-Final Office Action dated Sep. 4, 2018 for U.S. Appl. No. 15/367,738 (27 pages).
Non-Final Office Action dated Sep. 6, 2018 for U.S. Appl. No. 15/367,741 (24 pages).
Final Office Action dated Mar. 1, 2019 for U.S. Appl. No. 15/367,738 (18 pages).
Notice of Allowance dated May 14, 2019 for U.S. Appl. No. 15/367,738 (14 pages).
Final Office Action dated Mar. 5, 2019 for U.S. Appl. No. 15/367,741 (21 pages).
Notice of Allowance dated May 24, 2019 for U.S. Appl. No. 15/367,741 (15 pages).
Office Action dated Apr. 5, 2019 in CA Patent Application No. 3,007,361 (6 pages).

* cited by examiner

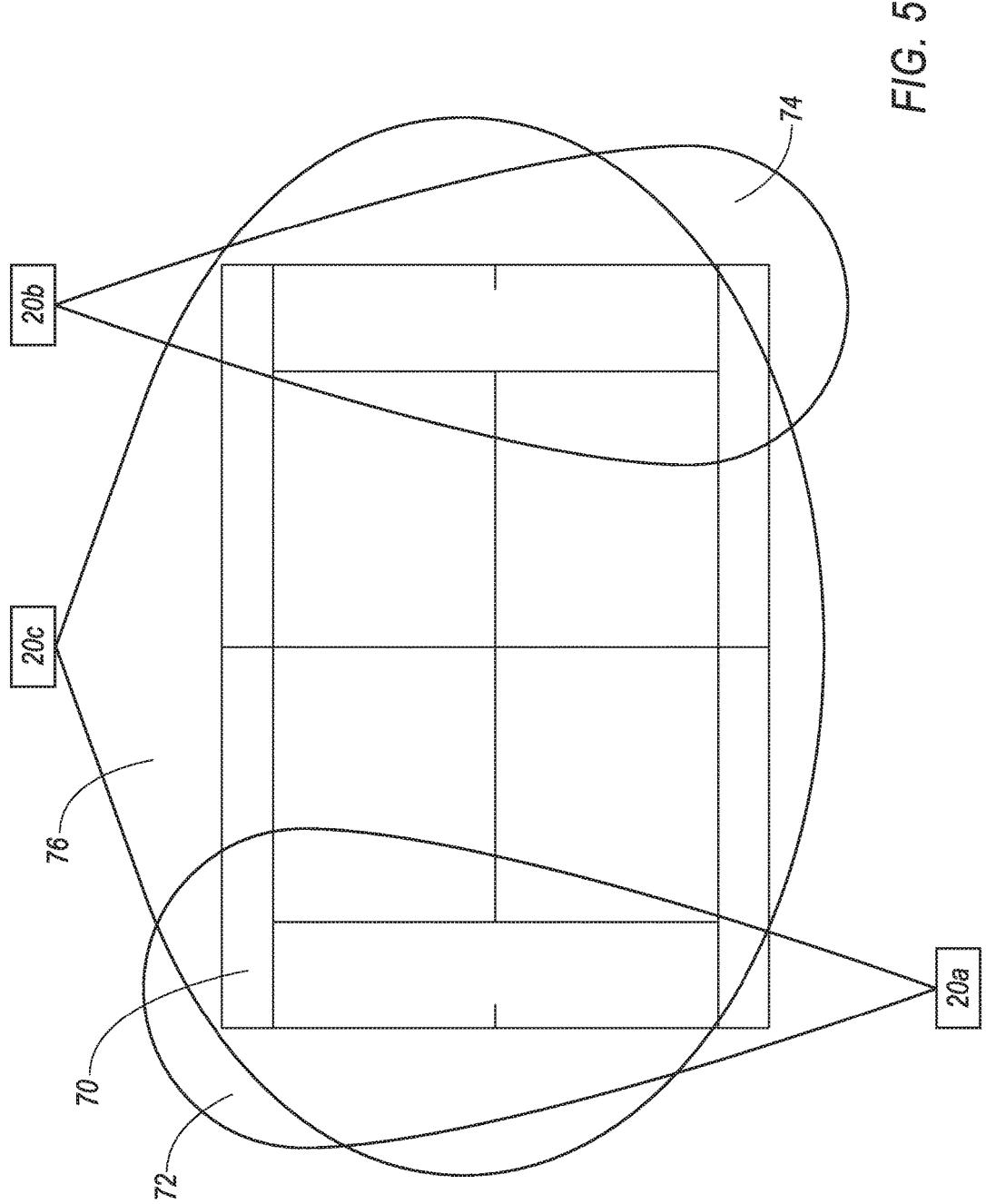

PROCESSING OF MULTIPLE MEDIA STREAMS

CROSS-REFERENCE TO RELATED APPLICATIONS

This application claims priority to and all benefits of U.S. Provisional Patent Application No. 62/263,080 filed Dec. 4, 2015.

BACKGROUND

The use of streamed media data such as video data has increased rapidly. Videos are used for instructional purposes, to record and view sports events, to share personal and family events, to sell real estate, etc. Security cameras, traffic cams, etc. provide streams of media data that may be collected and monitored at a single location. Drones equipped with video cameras provide yet another platform for the generation and streaming of videos. Users may wish to mix data from multiple input data streams into a single output data stream to view immediately or store for later viewing.

DRAWINGS

FIG. 5 is a diagram of a tennis court illustrating exemplary placement and coverage ranges of cameras for recording a tennis match.

DETAILED DESCRIPTION

System Overview

A media processing system including a media studio allows the user to bring the studio along to live events. The media studio allows for preview, e.g., simultaneous preview, of multiple media input items (referred to herein as an aggregated media item), generating a media output item based on the multiple media input items, sharing the media output item, and storing the media output item for future viewing, all via a remote operator console. The media studio may be programmed to generate recommendations for the media output item and/or generate the media output item directly based on predetermined rules.

In addition to media input items, the media studio may receive data from data collectors, e.g., one or more sensors mounted on or in a media device such as a camera providing a media input, included with another device carried by a user of the camera, etc. The data may be received directly from the data collectors, or indirectly, for example via metadata associated with the media input items. The selection of media input items for inclusion in the media output item may be based in part on the data from the data collectors.

A variety of types of data may be used by the media studio. For example, the data may include biometric data (e.g., heart rate, blood pressure, etc.) associated with a user of a camera and which may be used, e.g., to determine an excitement level of the user. As another example, the data may be data indicative of the quality of a media input item such as steadiness of a camera, contrast of an image, etc. Still further, the data may include location data or movement data associated with an object or participant in the event to be recorded (e.g., a player in a sports event, a ball being used in a sports event, etc.). Still further, the data may include global positioning data, weather data, light conditions, etc. related to the recording environment. Other types of data, collected from sensors, or, e.g., from other computing devices, may also be used for selecting the content for and/or generating the media output item.

The predetermined rules for generating the media output items may include making decisions based on the input from the one or more data collectors. For example, in order to be included in the media output item, the media input item may need to meet quality criteria such as having a picture contrast within a predetermined range, or being sufficiently steady (shaking level below a predetermined threshold). The use of data from data collectors for determining a media output item will be discussed in detail below.

Figure 1:
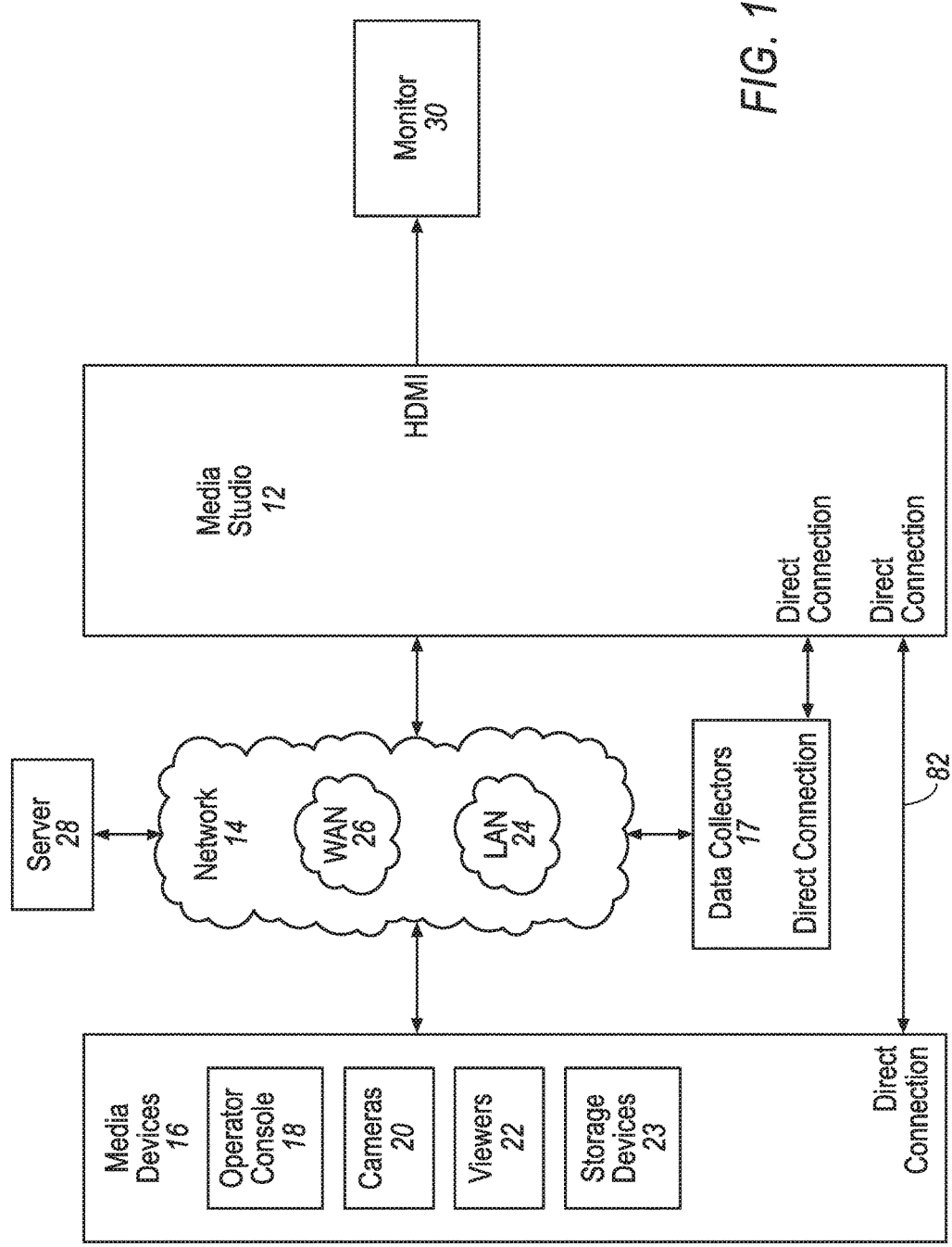
FIG. 1 is a block diagram of an exemplary media processing system for capturing and mixing multiple media streams into an output media stream.

Referring to FIG. 1, a media processing system 10, including a mobile media studio 12, can receive media input data from one or more media devices 16. The media input data may be received via one or more wired and/or wireless networks 14 and one or more wired and/or wireless direct connections. Receiving media data may include receiving media data sent from a media device 16, e.g., a camera 20, or retrieving data, e.g., from a storage device 23. Additionally, the media studio 12 may receive data from one or more data collectors 17. The data collectors 17 may include a variety of sensors including biometric sensors such as heart rate monitors, blood pressure monitors, etc.; movement sensors such as accelerometers, gyroscopes, etc.; location sensors such as global positioning systems, RFID tags, etc.; environmental sensors such as barometers, thermometers, light sensors, etc.; and other types of sensors which may provide data related to a recording event. The data collectors 17 may further include systems such as global positioning systems (GPS), weather tracking systems, etc.

As used herein, the recording event may refer to the actual event being recorded, for example, a football game or company picnic, including the environment, participants, camera 20 operators, media studio 12 operators, operator console 18 operators, viewers, audience, etc. related to the event being recorded. Further, the data collectors 17 may provide data, or may be included in one or more of the media devices 16, and provide data via, for example, a computing device in the media device 16.

The media studio 12 can be controlled by, and receive media input data from, an operator console 18, which may be remote to the media studio 12. The media studio 12 further can generate media output data and provide the media output data to media devices 16, e.g., a viewer 22. The system 10 allows a user to produce media output data at a location where the recording (or a portion of the recording) is taking place. Controlling the media studio 12 via a remote operator console 18 provides the user the freedom to move about the recording location while maintaining oversight and control over the production process.

Exemplary System Elements

Referring now to FIG. 1 in more detail, the media processing system 10 includes a media studio 12, one or more media devices 16, and one or more data collectors 17. The one or more media devices 16 include the operator console 18, and may further include one or more cameras 20, one or more viewers 22, and one or more media storage devices 23. The media devices 16 and the data collectors 17 may be remote or local to the media studio 12 and may be coupled to the media studio 12 via at least one of the network 14 and a direct wired or wireless connection 82.

A server 28 may also be communicatively coupled to the media studio 12, the media devices 16, and the data collectors 17 via the network 14. Additionally, the media processing system 10 may include a monitor 30 communicatively coupled to the media studio 12.

The media studio 12 generally can receive multiple media input items substantially simultaneously, and can combine them into an aggregated media item for viewing via the operator console 18. An "aggregated media item," as that term is used herein, is a set of two or more of the media input items, arranged to be displayed substantially simultaneously on a user display, such as a touchscreen, a screen with projected or overlaid images, etc. The media input items may be arranged such that they appear side by side, in rows, in a picture-in-picture format etc. within the user display. In addition, the aggregated media item may include, for example, a graphical user interface which is displayed on the user display and accepts user inputs. As described below, the media studio 12 may compress the aggregated media item prior to providing it to the operator console 18.

The media input items may be visual and/or audio data such as videos captured by a video camera, sounds captured by a microphone, scenes from a security camera, etc. The microphone may be integrated in a media device 16, or may be a standalone media device 16 which can independently communicate with the media studio 12. The media input items may be, e.g., streamed data or static data such as single digital photographs. The media studio 12 further can receive commands from the operator console 18, and can generate a media output item according to the received commands. The media output item may include data from one or more of the media input items.

As an example, the media studio 12 may receive four media input items. The media studio 12 may generate an aggregated media item including each of the four media input items, and transmit the aggregated media item to the operator console 18. A user of the operator console 18 may select, via a user interface, one of the four views in the aggregated media item to be included in the media output item. Based on a command received from the operator console 18, the media studio 12 may generate the media output item that includes the selected media input item. The media output item may be transmitted via a network 14 to be shared with viewers, or stored in a storage device 23.

In addition to selecting one or more media input items to be included in the media output item, the media studio 12 may perform various media processing operations. The media processing operations may be performed based on commands received from the operator console. A nonlimiting list of example processing operations that may be performed by the media studio 12 includes scaling, mixing, morphing, compositing, adding overlays (audio and/or video), etc. In addition, the media studio may perform operations such as object tracking, image stabilization, etc. The operation of the media studio 12 will be discussed in greater detail below.

The media studio 12 may further be programmed to recommend, e.g., to the operator console 18, media input items to be included in a media output item and/or to generate a media output item based on one or more predetermined rules. The predetermined rules may be, e.g., input by a user or learned by the media studio 12 based on previous operator choices. For example, the media studio 12 processor 62 may be programmed to learn user preferences based on previous choices and may include a hardware learning mechanism such as a neural network, etc. Examples of rule based selection of media input items for inclusion in a media output item are discussed below.

Communications between the media studio 12 and the media devices 16 and data collectors 17 (collectively networked devices 16, 17) may occur via the network 14 and via direct connections 82, e.g., wired and/or wireless (e.g., Bluetooth, IEEE 802.11, etc.) connections such as are known. In general, the network 14 represents one or more mechanisms for delivering media content between the media studio 12 and the networked devices 16, 17. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) 24 such as a WiFi network or Ethernet, and/or wide area networks (WAN) 26 such as the Internet, etc.

In addition to the one or more networks 14, one or more wired or wireless direct connections may be used to connect the media studio 12 to the media devices 16. Direct connections may include, e.g., Bluetooth, Universal Serial Bus (USB), high-definition multimedia interfaces (HDMI), custom serial interfaces, etc.

For example, one or more high-definition multimedia interfaces (HDMI) may be used to transfer data between a media device 16 and the media studio 12, or from the media studio 12 to a computer or television monitor 30. The HDMI is a well-known proprietary audio/video interface for transferring uncompressed video data and compressed or uncompressed digital audio data from a HDMI-compliant source device such as the media device 16 to a digital media processing device such as the media studio 12 or to the compatible computer monitor, e.g., a monitor 30.

The server 28 may be communicatively coupled to the media studio 12, the media devices 16, and the data collectors 17 via the network 14. The server 28 may include a communications circuit for communicating via the network 14, and may further include a memory and one or more processors configured to perform programs, i.e., sets of computer-executable instructions, stored in the memory. The server 28 may, e.g., receive media output items and store the media output items for future use.

Media content, such as the media input items, media output items, and/or multiview media items, is generally delivered via the network 14 in a digital format, e.g., as compressed audio and/or video data, and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), or according to some other standard or standards. For example, media content could be audio data formatted according to standards such as MPEG-2 Audio Layer III (MP3), Advanced Audio Coding (AAC), etc. Further, the foregoing standards generally provide for including metadata.

Media devices 16 include the operator console 18 and may include one or more cameras 20, one or more viewers 22 and one or more storage devices 23. The operator console 18 may be used to control the operation of the media studio 12, and in some cases, may also perform as a media input device 16 such as a camera 20, as described below. Media devices 16 may further include data collectors 17, for example gyroscopes, accelerometers, etc., which may provide data related to the media device 16 such as movement, location, etc.

Figure 2:
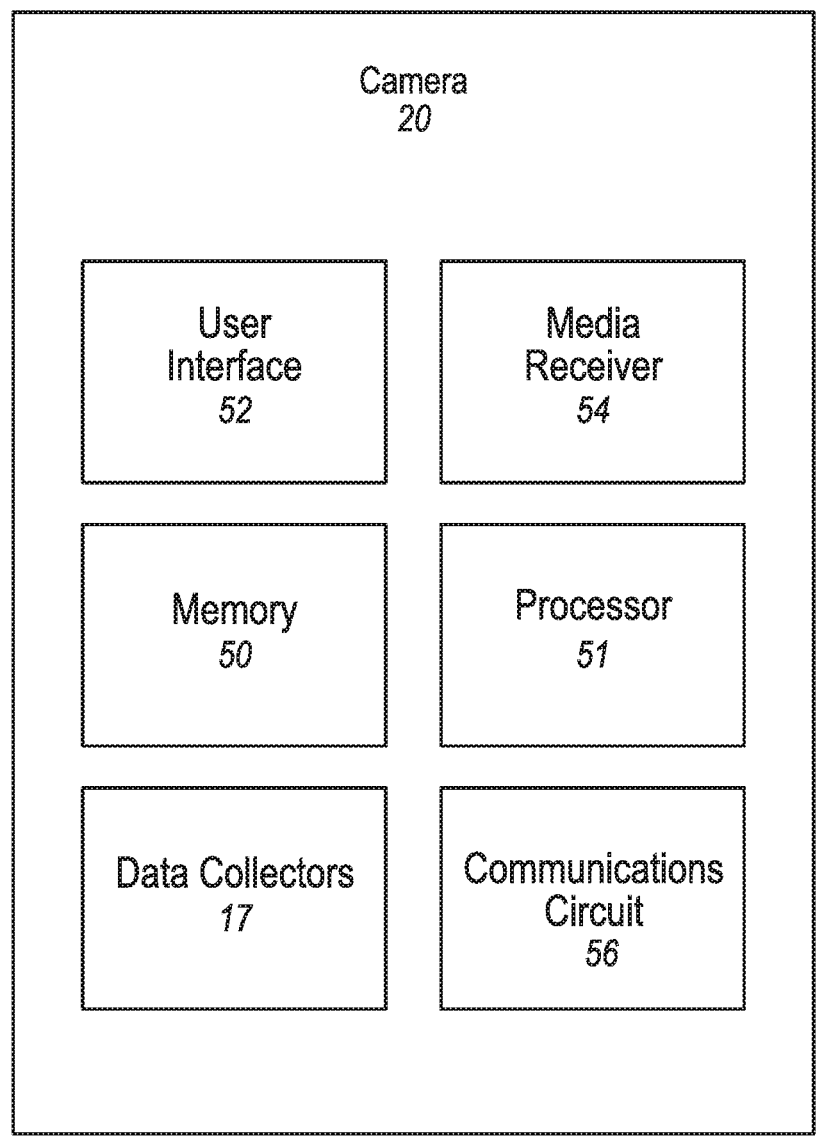
FIG. 2 is a block diagram of an exemplary camera for the media system of FIG. 1.
Figure 3:
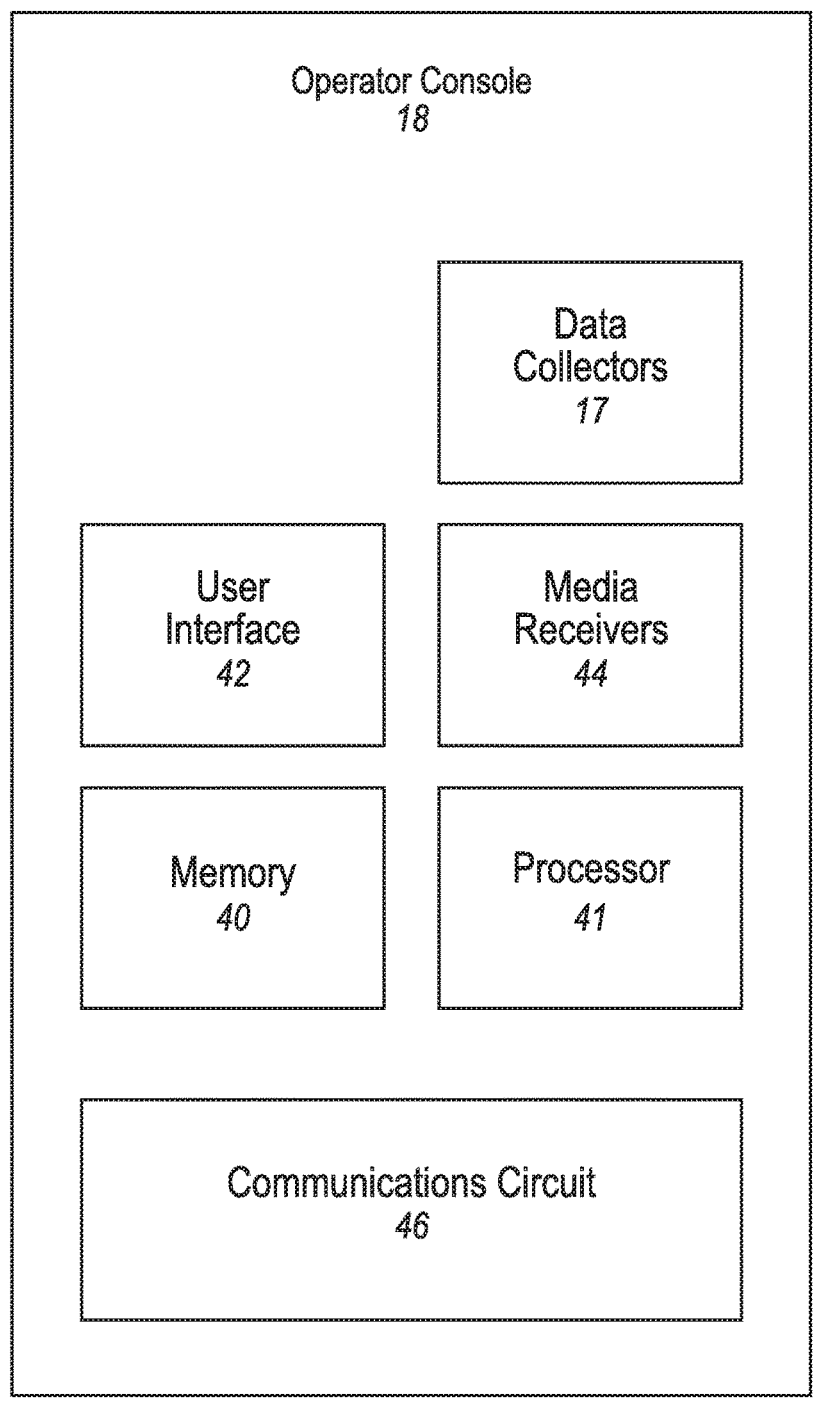
FIG. 3 is a block diagram of an exemplary operator console for the media processing system of FIG. 1.

A block diagram of an exemplary camera 20 is shown in FIG. 2. The camera 20 may include a memory 50 and a processor 51, the memory 50 storing program code, i.e., computer-executable instructions, executable by the processor 51. The memory 50 may include video buffers which may be used for replays, applying video audio filters, compressing and decompressing media data, etc. The processor 51 may be communicatively coupled to a user interface 52, a media receiver 54, a communications circuit 56, and data collectors 17. The camera 20 captures media data, i.e., visual and sound data such as photographs and videos, and transmits the media data, e.g., via the network 14, to the media studio 12. Examples of a camera 20 include portable devices such as smartphones, tablets, laptops, digital cameras, etc. Examples of cameras 20 may further include security cameras, traffic cams, cameras transported by airborne drones, etc.

The media receiver 54 includes one or more data receiving elements for receiving media data. The collected media data may include visual data and audio data. The media receiver 54 may include, e.g., microphones for receiving sound data and CMOS or CCD image sensors for receiving image data.

The user interface 52 is communicatively coupled to the processor 51 and may include one or more input devices such as a microphone, buttons, a touchscreen display, a mouse, a keyboard, a gesture-recognition device, switches, etc., for receiving input from the user. The user interface 52 may further include one or more output devices such as a display, lamps, speakers, etc. for communicating information to the user.

The data collectors 17 may be used to determine, e.g., operating conditions of the camera 20, and may include accelerometers, gyroscopes, light meters, etc. The data collectors 17 may be used to measure, for example, movement of the camera 20 (shaking, tracking of an object), the direction the camera 20 is pointing, the light conditions under which the camera 20 is operating, etc. The data collectors 17 may provide data to the processor 51, which may, e.g., send the data to the media studio 12 for additional processing.

For each quality parameter (steadiness, contrast ratio, etc.), a user can set operational intervals. Operational intervals are defined as ranges of parameters related to a media input item which indicate that the media item is suitable for further processing. For example, if a steadiness of a camera 20 is not within an operational interval, the media input item associated with the camera 20 may not be considered by the media studio 12 for additional processing. The operational interval in that example may be the amplitude of shaking that is acceptable. In case all quality parameters are within their respective operational interval, an overall quality parameter Q is calculated for each camera 20 and/or associated media input item:

$$Q_i = C_i * \sum_{k=1}^{n} CQ_k * PQ_k$$

in which i is an index corresponding to the ith camera 20, $C_i$ is a coefficient corresponding to the ith camera 20 representing quality characteristics (e.g., a professional camera 20 will have a higher coefficient $C_i$ than a camera 20 embedded in a mobile phone), k is an index of types of picture-quality measurements (e.g., k=1 is resolution, k=2 is brightness, k=3 is contrast ratio, . . . k=n is steadiness), $CQ_k$ is a weighting factor for the relative importance of the kth type of picture-quality measurement, and $PQ_k$ is a scaled value for the kth type of picture-quality measurement. The weighting factors $CQ_k$ may be set by a system designer or by a user. The values $PQ_k$ may be scaled to make different types of picture-quality measurements k commensurable.

The camera 20 may receive and transmit the media data, e.g., via the network 14, or via the direct connection 82, to the media studio 12. The received media data may be, as one example, full high-definition (Full HD) data, providing an image resolution of 1920 by 1080 pixels. Data formats with other resolutions may also be used.

The camera 20 may further receive data from, e.g., the media studio 12, and provide data, e.g., via the user interface 52, to the user of the camera 20. For example, as discussed below, the media studio 12 may determine, based on data received from the camera 20, that the camera 20 is shaking too much, e.g., above a predetermined threshold, or the contrast of the media input item received from the camera 20 is too low, e.g., below a predetermined threshold. The media studio 12 may send this data to the camera 20, which may display the information on the user interface 52.

The viewer 22 may be used to display media output data received from the media studio 12, and may include a display such as a liquid crystal display (LCD) or plasma display. The media data may be received, for example, via the network 14 or via the direct connection 82. Examples of the viewer 22 include mobile devices such as mobile phones, tablets, and laptops and may further include devices such as digital televisions. The viewer 22 may receive, e.g., Full HD data, providing a resolution of 1920 by 1080. Data formats with other resolutions may also be used.

The storage device 23 may store media data and provide an interface to allow the media studio 12 to access the data via the network 14 or via the direct connection 82. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), a hard drive, etc. Further, the media storage device 23 may include a processor, programmed, for example, to receive commands from the media studio 12. The processor may be further programmed, based on the commands, to retrieve media data items from data storage and send the media data items to the media studio 12.

Communications between the storage device 23 and the media studio 12 may be performed via the network 14. Additionally or alternatively, communications may be performed via the direct connection 82. For example, the storage device 23 may be connected to the media studio 12 via a Universal Serial Bus (USB) port, or other wired or wireless interface.

The operator console 18 may be used to control the operation of the media studio 12. As shown in FIG. 2, the operator console 18 may include a memory 40 and a processor 41, the memory 40 storing program code, i.e., computer-executable instructions, executable by the processor 41. The processor 41 may be communicatively coupled to a user interface 42, a media receiver 44, a communications circuit 46, and data collectors 17.

The user interface 42 is communicatively coupled to the processor 41 and may include one or more input devices such as a microphone, buttons, a touchscreen display, a mouse, a keyboard, a gesture-recognition device, switches, etc. for receiving input from the user. The user interface 42 may further include one or more output devices such as a display, lamps, speakers, etc. for communicating information to the user. All, or a portion of, the user interface 42 may be physically separate from the operator console 18. For example, the operator console 18 may be a tablet computer which projects its output to another screen, (e.g., air-play), while the operator continues to control the media studio 12 from the tablet computer.

The media receiver 44 may be, for example, a digital camera as is known that may receive media data. The media receiver 44 may include, e.g., a CMOS or CCD image processor for receiving visual data and a microphone for receiving audio data. The media data may include visual data such a still photographs and video recordings and may further include audio data such as a sound recording or soundtrack. The media receiver 44 may, e.g., output the media data to the processor 41.

The communications circuit 46 is communicatively coupled to the processor 41 and is configured to communicate with the media studio 12 via, e.g., the network 14 and/or through the direct connections 82.

The communications circuit 46 may include a radio frequency (RF) transceiver for WiFi communications (typically 2.4 GHz or 5 GHz bands). The RF transceiver may communicate, for example, directly with a RF receiver included in the media studio 12. Additionally or alternatively, the communications circuit 46 may include, e.g., an Ethernet interface, a Universal Serial Bus (USB) interface, a Bluetooth transceiver, a high-definition multimedia interface (HDMI), etc.

Alternatively, the communications circuit 46 may communicate with the media studio 12 indirectly, i.e., via an intermediate device. For example, the communications circuit 46 may communicate with another hotspot, i.e., a communications circuit including a router and client providing a connection to a wide area network (WAN) 26 such as the Internet. The media studio 12 may receive the communications via the WAN 26.

The data collectors 17 may be used to determine, e.g., operating conditions of the camera 20, and may include accelerometers, gyroscopes, light meters, etc. The data collectors 17 may be used to measure, for example, movement of the operator console 18 (shaking, tracking of an object), the direction the operator console 18 is pointing (for example, the direction the media data collector 44 is pointing), the light conditions under which the operator console 18 is operating, etc. The data collectors 17 may provide data to the processor 41, which may, e.g., send the data to the media studio 12 for additional processing. The data sent to the media studio 12 may be raw data, i.e., representative of data coming directly from sensors. Additionally or alternatively, the processor 41 of the operator console 18 may perform additional processing of the data. For example, the processor 41 may determine values such an excitement level, a quality level, etc. of the data and provide the determined values to the media studio 12. The data may be dynamic data which indicates the determined values as a function of time. Further, the operator console 18 processor 41 may, e.g., recognize objects within the media input item, perform audio filtering, and perform other media processing operations, and provide the results of these operations to the media studio 12.

The processor 41 is communicatively coupled to each of the user interface 42, the data collector 44, the communications circuits 46, and the data collectors 17.

The processor 41 is programmed to control the operation of the media studio 12 based on inputs received from a user via the user interface 42. More specifically, the processor 41 is programmed to receive a media content item, e.g., an aggregated media item including one or more views from one or more cameras 20, and to display the aggregated media item via the user interface 42. The processor 41 is further programmed to receive input from the user via the user interface 42. For example, the user may view the aggregated media item and select one of the views to be included in a media output item generated by the media studio 12. The processor 41 may send a command to the media studio 12 to include the selected view in the media output item.

In addition to commands related to selecting media input items for display in the media output item, commands from the operator console 18 may include instructions to perform operations such as scaling, mixing, morphing, compositing, adding overlays, etc. Further, commands from the operator console 18 may include instructions to perform operations such as object tracking, image stabilization, etc.

Figure 4:
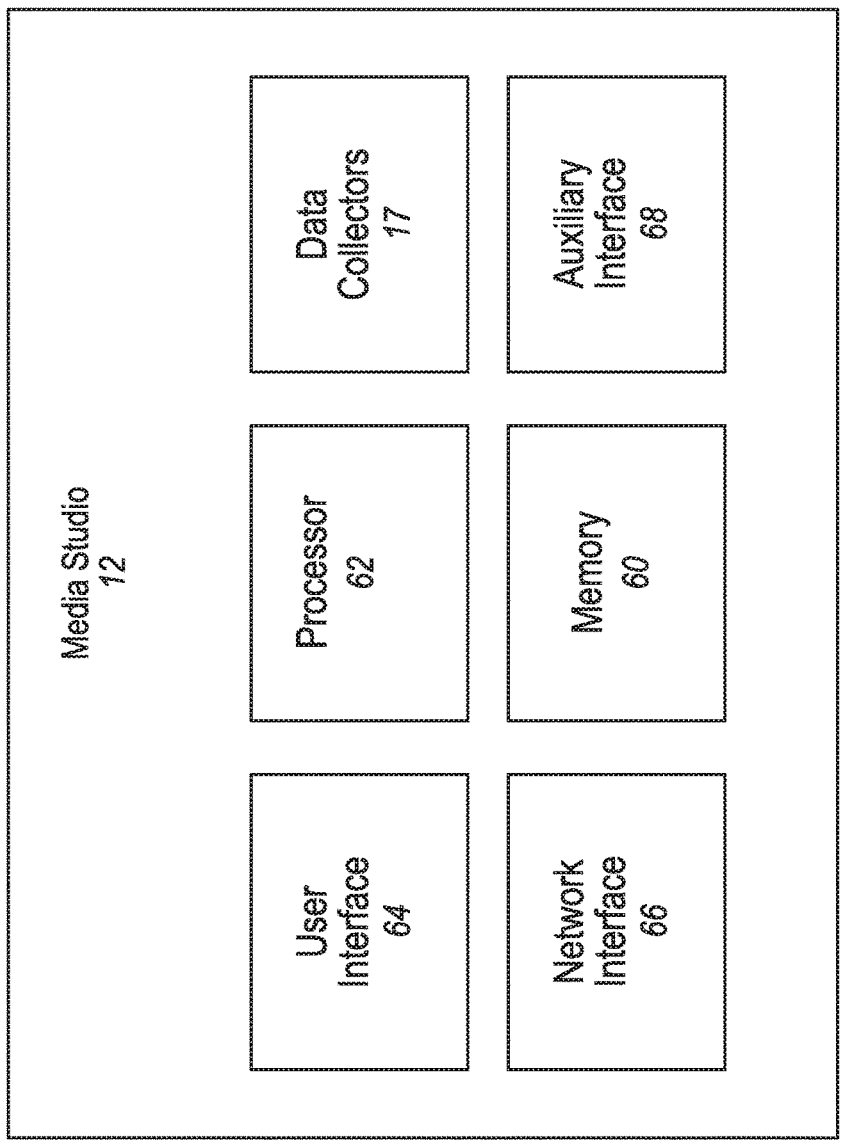
FIG. 4 is a block diagram of an exemplary media studio for the media processing system of FIG. 1.

An exemplary media studio 12 is shown in FIG. 4. The media studio 12 includes an internal memory 60 and a processor 62, the memory 60 storing program code, i.e., computer-executable instructions, executable by the processor 62. The processor 62 is communicatively coupled to a user interface 64, a network interface 66, an auxiliary interface 58, and data collectors 17.

The internal memory 60 may be, e.g., read only memory (ROM), random access memory (RAM), flash memory, electrically programmable memory (EPROM), electrically programmable and erasable memory (EEPROM), embedded MultiMediaCard (eMMC), a hard drive, etc., and may be used to store programs executable by the processor 62, as well as to store, for example, data representing inputs from the user, instructions received from the operator console 18, media data received from a remote media device 16, media metadata, data collected by data collectors 17, etc.

The user interface 64 is communicatively coupled to the computer 62 and may include one or more output devices such as a display, lamps, speakers, etc. for communicating information to the user. The user interface 64 may further include one or more input devices such as buttons, a microphone, a touchscreen display, a mouse, a keyboard, a gesture-recognition device, switches, etc. for receiving input from the user.

The network interface 66 includes one or more interfaces to the network 14. For example, the network interface 66 may include a hotspot, such as is known, for WiFi communications. The hotspot may include a router. The router may include a radio frequency (RF) transceiver for WiFi communications (typically 2.4 GHz or 5 GHz bands) and may receive multiple transmissions substantially simultaneously. The router may connect media devices 16 with the processor 62 of the media studio 12.

Additionally, the network interface 66 may include a link to an Internet Service Provider (ISP). The link is a mechanism for connecting to and communicating with the Internet Service Provider, e.g., satellite communications or a cable network. The link may include a transceiver and antenna for satellite communications, e.g., in the Ka band (18.3-30 GHz). The link to the ISP may receive, via the network 14, Internet protocol (IP) communications from, e.g., media devices 16 and data collectors 17.

In addition to connecting the media devices 16 with the processor 62 of the media studio 12, the router and the Internet client may be used in combination to provide Internet access for media devices 16.

The auxiliary interface 68 may include one or more wired or wireless interface circuits which may be used, for example, to connect to one or more media devices 16. The media devices 16 may include, e.g., one or more storage devices 23. The auxiliary interface 68 may include a universal serial bus (USB) interface circuit to communicate with external USB devices, for example, a memory stick or memory back-up device. As another example, the auxiliary interface 58 may include a MicroSD interface, as is known, to store data on and retrieve data from a MicroSD data card. Further, the auxiliary interface 68 may include, e.g., a Bluetooth interface for wireless connection to a media device 16. The auxiliary interface 68 may also be used to connect to data collectors 17.

Additionally, the media studio 12 may include a high-definition media interface (HDMI) for connecting to a media device 16, such as a camera 20, monitor 30 (as shown in FIG. 1), etc.

The media studio 12 processor 62 is generally programmed to receive one or more media input items from one or more media devices 16. The media studio 12 processor 62 may, in some cases, generate an aggregated media item. The aggregated media item may include, for example a picture-in-picture (PIP) display, wherein two or more of the media input items are displayed simultaneously, e.g., side by side, within the aggregated media item. The media studio 12 may transmit the aggregated media item via the network 14 to the operator console 18.

The media studio 12 processor 62 is further programmed to receive commands from the operator console 18. Based on the commands, the media studio 12 may generate a media output item. The processor 62 may select data from one or more of the media input items to include in the media output item. The media studio 12 may further, based on commands received from the operator console 18, perform various media processing operations such as scaling, mixing, morphing compositing, adding overlays, tracking of specific people or objects, smart tagging, etc. related to the generation of the media output item.

In addition, the media studio 12 may perform media processing operations based on predetermined rules for generating the media output item. Examples of rules are discussed below.

The media studio 12 processor 62 may output the media output item, e.g., to viewers 22, to the operator console 18, and/or to other display devices. Additionally or alternatively, the media studio 12 may output the media output item, e.g., to a server 28, or to storage devices 23, where the media output item may be stored for future use. Various processes which may be performed by the media studio 12 processor 62 are described below.

Processes

Generating an Output Media Item from One or More Input Media Items

Generally, the media studio 12 processor 62 is programmed to receive one or more media input items from one or more respective media devices 16. The media input items may be received, e.g., via the network 14 or via the direct connection 82 as described above. The media input items may be compressed data or uncompressed data. Examples of compression standards that may be used for compressed data include H.264/MPEG4, MPEG2, MPEG1, and Advanced Audio Coding (AAC). Additionally, various resolution formats may be used for the data. For example, the data may be Full High Definition data providing an image resolution of 1920 by 1080 pixels. Other resolutions may also be processed by the media studio 12.

Upon receiving the media input items, the processor 62 may decompress the media input items to prepare the media input items for further processing. In order to compensate for latency between the multiple media input items, the processor 62 may additionally be programmed to time synchronize the media input items. The time synchronization may be done, for example, during decompression.

Based on the media input items, the processor 62 may be programmed to generate an aggregated media item and transmit the aggregated media item to the operator console 18. The aggregated media item may include one or more of the media input items, arranged to be displayed substantially simultaneously on a user display, such as a touchscreen. The media input items may be arranged such that they appear side by side, in rows, in a picture-in-picture format, etc. within the display. In addition, the aggregated media item may include, e.g., a graphical user interface which is displayed on the user display and accepts user input. The processor 62 may compress the aggregated media item and may then transmit to aggregated media item to the operator console 18 via the network 14 or the direct connection 82.

The processor 62 may be further programmable to generate a media output item based on the media input items and commands received from the operator console 18. The processor 62 may receive commands from the operator console 18 to select one or more media input items to include in the media output item. Additionally, the processor 62 may receive commands to perform video and audio processing operations such as switching, mixing, compositing, scaling, morphing, etc.

Upon generating the media output item, the processor 62 may transmit the media output item to one or more media devices 16 for viewing. The processor 62 may additionally store the media output item for future use. Prior to transmission and/or storing of the media output item, the processor 62 may additionally compress and/or encrypt the data.

In addition to receiving commands from the operator console 18, the processor 62 may further be programmable to perform video processing operations based on one or more predetermined rules, as described below.

Selecting Input Data for Inclusion in the Media Output Item Based on an Excitement Level The media studio 12 processor 62 may select a media input item for inclusion in the media output item based on an excitement level associated with the media input item. The excitement level may be determined based on one or more types of data received from data collectors 17.

The data may include, for example, biometric sensor data of the user of the media device 16 which is generating the media input item. For example, one or more data collectors 17 may be associated with a user of a media device 16. The data collectors 17 may measure, for example, the pulse rate of the user, the blood pressure of the user, the pupil dilation of the user, etc., and send the biometric data to the media studio 12 processor 62. The processor 62 may determine, based on the biometric data, for example, that the pulse and/or blood pressure of the user is elevated, and that the user is excited.

Excitement values may be collected from the data collectors 17 associated with particular cameras 20 (e.g., included in a camera 20 or attached to a camera 20 user). An overall excitement parameter E, is calculated for each data collector 17 (associated with, e.g., a camera 20, a position on the recording field, a position near some part of the recording field, etc.):

$$E_i = D_i * \sum_{k=1}^{n} DQ_k * EQ_k$$

in which i is an index corresponding to the ith data collector 17, $D_i$ is an overall correction coefficient corresponding to the ith data collector 17, k is an index corresponding to a kth type of excitement measurement (e.g., k=1 is blood pressure, k=2 is pulse rate, k=3 is pupil dilation, . . . k=n is hand speed to represent cheering or clapping), $DQ_k$ is a specific correction coefficient corresponding to the kth type of excitement measurement, and $EQ_k$ is a scaled value for the kth type of excitement measurement. The overall correction coefficient $D_i$ represents how much the data from the ith data collector 17 should be adjusted to produce an expected excitement value that corresponds to a real excitement value (e.g., a historically calculated value, when, for example, after the event, one or more experts determine a scale for evaluating the excitement level). The specific correction coefficient $DQ_k$ may be used to account for the individual nature of excitement parameters such as heartbeat rate, blood pressure, etc. For example, the overall correction coefficient $D_i$ and the specific correction coefficient $DQ_k$ may be determined by measuring the biometric data of the user in three conditions: a first condition when the user is at rest in a low-stimulation environment, a second condition when Serena Williams appears on the tennis court, and a third measurement when an ace is served, and comparing these values with generic values for similar measurements of the general population. The processor 41 of the media studio 12 (or other computing device) may determine the specific correction coefficient $DQ_k$ for each type of excitement measurement k based on the measurements under the three conditions. Additionally or alternatively, other data, e.g., historical data, may be used. $EQ_k$ may be scaled to make different types of excitement measurements k commensurable.

As another example, the excitement measurements k may further include movement data associated with the media device 16. For example, the media device 16 may be moving rapidly in order to follow a play (or a player) during a sports event.

As yet another example, the excitement measurements k may include cheering or screaming, for example, by the audience, received by a microphone associated with the media device 16. For example, a media device 16 may be recording a section of a course associated with a bicycle race. When the bicycles approach that section of the course, the audience may start to cheer. The processor 62 may receive data including the cheering and determine, e.g., according to sound volume and/or other known sound recognition techniques, that the race has become exciting in the area of the course being recorded by media device 16.

The processor 62 may further be programmed to distinguish between different types of excitement. For example, using known sound recognition techniques, the processor 62 may be programmed to identify the crying of a baby. The processor 62 may filter out the crying. Alternatively, the processor 62 may, based on the crying, select a different media input item, that does not include the crying, for display in the media output item.

As another example, the processor 62 may identify an elevated excitement level based on an image included in media data. For example, using known image analysis techniques, the processor 62 may detect rapid movement within the image, such as a ball or player passing quickly through the field of view. As another example, the media device 16 may be recording the audience, and the processor 62 may detect when a large number of people stand up, or may, based on known facial recognition techniques, detect excited expressions on the faces of the audience.

The media studio 12 processor 62 may, based on one or more of these excitement measurements k, select a particular media input item for display in the media output item. In the case of an active user operating the operator console 18, the processor 62 may recommend a particular media input item for selection by the user. For example, the processor 62 may highlight the media input item within the aggregated media item sent to the operator console 18.

Excluding Blank or Accidental Recordings from the Media Output Item

The media studio 12 processor 62 may be programmed to identify media input items that are blank or appear to be accidentally recorded. For example, a camera operator may forget that a camera 20 is recording, and point an image capture device towards the ground, sun, etc. The processor 62 may receive, for example, data from data collectors 17 on the camera 20 indicating that the camera 20 is pointing toward the ground. Additionally or alternatively, the processor 62 may recognize an image of the ground, determine that the image of the ground is not related to the event being recorded, and exclude it from the output media item.

As another example, an operator may forget to turn a camera 20 off, and put the camera in the operator's pocket. A data collector 17 on the camera 20 may detect, for example, that the camera is in a dark environment and provide the data to the processor 62. Alternatively, the processor 62 may detect that the media input item received from the camera 20 is completely black. Based on the data indicating a dark environment and/or the image data, the processor 62 may choose to exclude the media input item from the camera 20 from further processing.

Other conditions, such as excessive shaking of the camera 20, high ambient light conditions, etc. may also be used to exclude images from further processing.

Selecting a Media Input Item for Inclusion in the Media Output Item Based on the Rules and Type of Playing Field Related to an Event The media studio 12 processor 62 may compose a media output item from one or more media input items based on the rules and type of playing field related to an event. Based on the rules, the processor 62 may be able to predict where the next action may take place. The processor 62 may further know, based on user input, the location of one or more media devices 16 relative to a playing field, and the areas of the playing field being recorded by each of the media devices 16. The processor 62 may select to display the media input item from the area of the field where the next activity is predicted.

For example, and referring to FIG. 5, the event being recorded may be a tennis match which is being played on a tennis court 70. First, second, and third cameras 20a, 20b, 20c may be used to record the tennis match and may respectively be arranged to record first, second, and third ranges 72, 74, 76 of the court 70 and surrounding area.

The processor 62 may determine for example, based on the rules, that a first player, serving from the range 72, is about to serve. The processor 62 may select a media input item being generated by the first camera 20a for display in the media output item.

The processor 62 may then, for example, monitor the media input item received from the first camera 20a and determine that the first player has executed the serve. The processor 62 may determine that the ball is now in play and select a media input item received from the third camera 20c, showing the entire court 70, for display in the media output item.

Upon detecting that play has ended for a particular serve, the processor 62 may, e.g., switch back to the first camera 20a, in order to display the next serve from the first player.

The processor 62 may further, for example, based on user input and/or analysis of image data, keep track of a score for a game and set. When, for example, according to the example above, the game is over, the processor 62 may determine that a second player will take over the serve, and the processor 62 may then select a media input item received from the second camera 20b for display during serves.

Recommending Camera Setup for Recording an Event

The media studio 12 processor 62 may, for a particular type of event, recommend a preferred setup for cameras 20 capturing the event. The recommendations may be made, e.g., based on the number of cameras 20 available, the shape of the field, knowledge of the event to be captured, etc.

For example, a user of the media studio 12 may indicate, via the user interface 64, that the user would like to record a tennis match. The user may indicate that three cameras 20 are available for recording the match. Based on the input, the processor 62 may display, e.g., via the user interface 64, a diagram similar to the diagram of FIG. 5. The diagram may recommend locations for each of the first, second, and third cameras 20a, 20b, 20c, and the respective first, second, and third ranges 72, 74, 76 recommended to be covered by each of the cameras 20a, 20b, 20c.

Figure 6A:
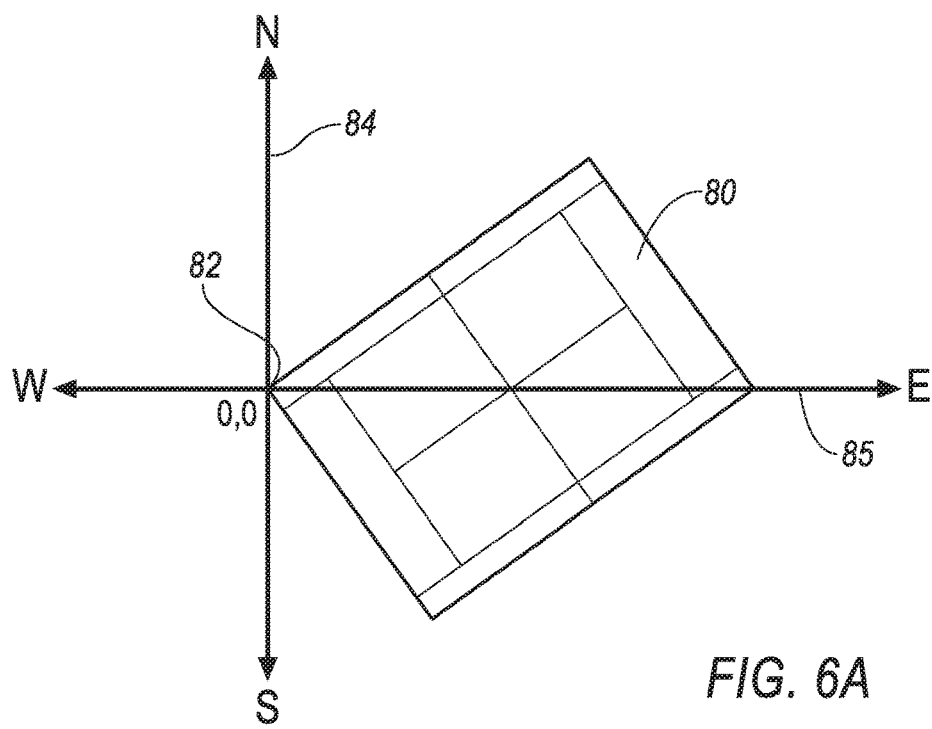
FIG. 6A is a diagram of a tennis court including an exemplary coordinate system.

The processor 62 may use additional types of data, such as orientation of the playing field, location of the sun relative to the playing field during a game, location of players' benches, etc., to recommend locations for cameras 20 during a recording event. For example, as in the example above, the user may indicate that the user would like to record a tennis match. An example playing field 80 is shown in FIG. 6A. The playing field 80 may be an outdoor playing field 80 for which global positioning data is available. The user may establish coordinates of the playing field 80 relative to, e.g. a north/south axis 84 and an east/west axis 85, and define a coordinate of 0,0 for a westmost corner 81 of the playing field 80.

Figure 6B:
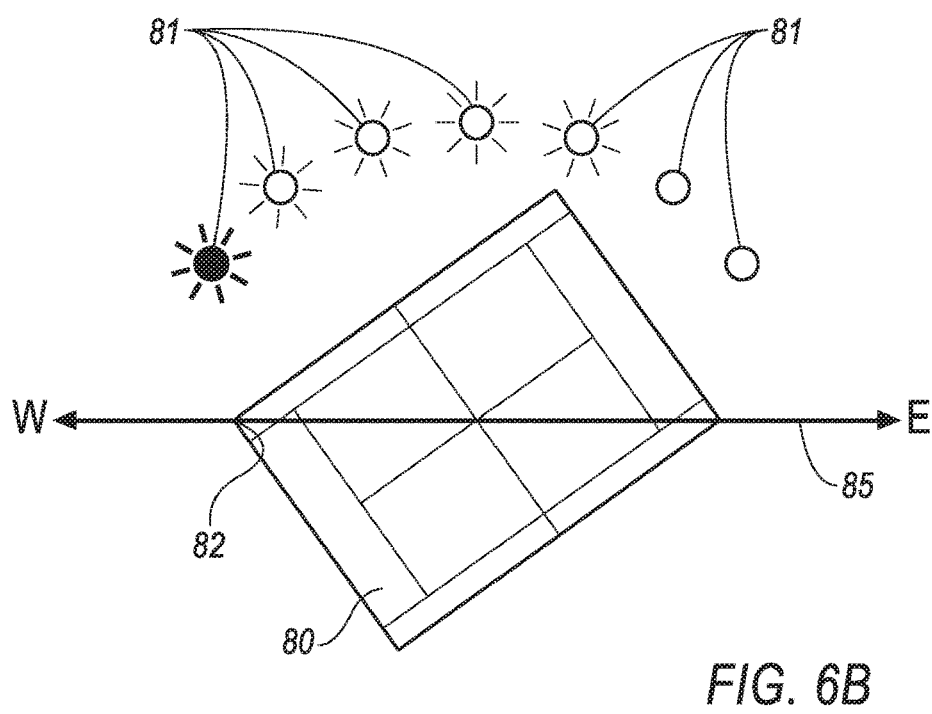
FIG. 6B is a diagram of the exemplary tennis court of FIG. 6A illustrating an exemplary track of the sun.

As shown in FIG. 6B, based on, e.g., the global positioning data, a time and date of the game, etc., the processor 62 may determine a position of the sun 81 relative to the playing field 80 during the anticipated game time. The processor 62 may further consider, e.g., weather conditions, such as a predicted level of cloudiness during the anticipated game time. The processor 62 may still further consider, e.g., characteristics of a camera 20, such as focal length, zoom capability, etc.

Figure 6C:
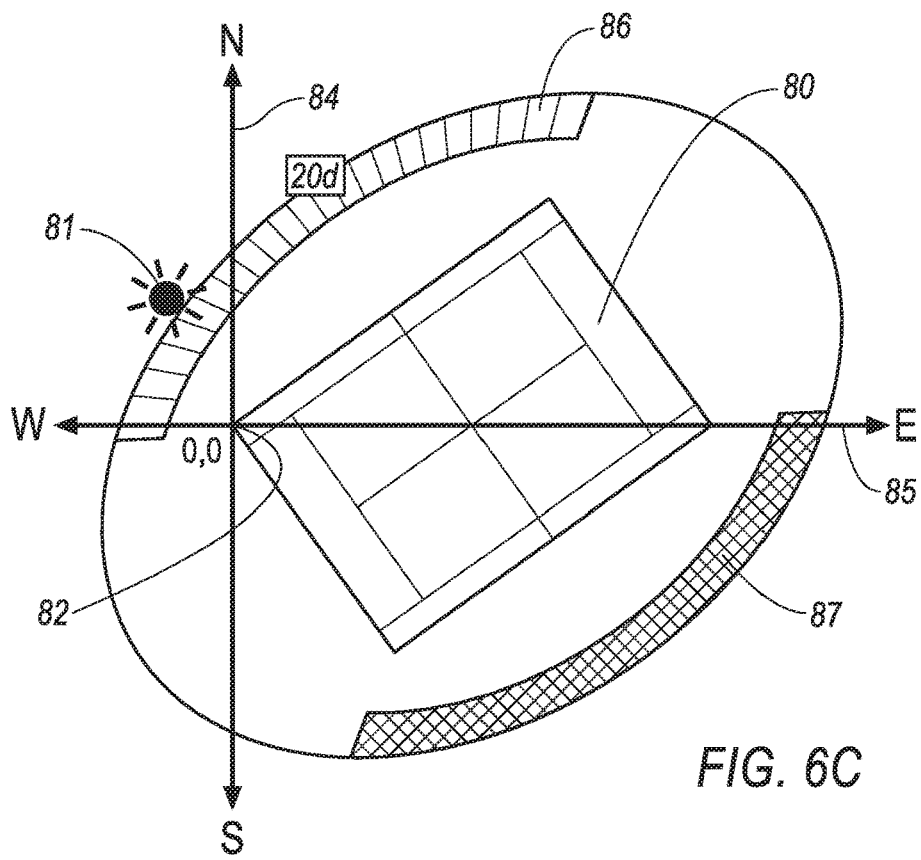
FIG. 6C is a diagram of the exemplary tennis court of FIG. 6C illustrating a preferred and nonpreferred range for placement of a first camera.

Based on the orientation of the playing field 80, position of the sun, weather conditions, characteristics of one or more available cameras 20, etc., the processor 62 of the media studio 12 may determine preferred and nonpreferred ranges for the one or more cameras 20 relative to the playing field 80. For example, referring to FIG. 6C, a preferred area for operating a first camera 20d may be in range 86. Range 86 may allow the first camera 20d, based on the focal length, zoom, etc., to capture the entire playing field without facing the sun 81.

The processor 62 may further identify a nonpreferred range for operating the first camera 20d. For example, the range 87 may be nonpreferred, as recording the game would require recording while facing the sun 81.

Figure 6D:
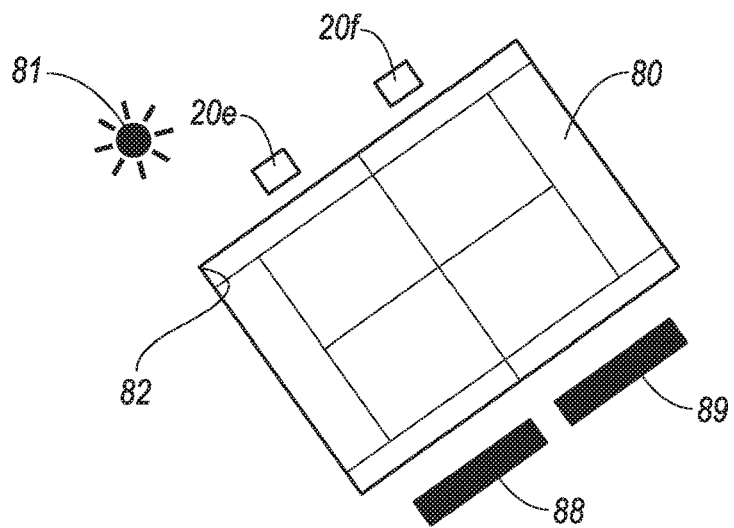
FIG. 6D is a diagram of the exemplary tennis court of FIG. 6D including player benches and indicating a preferred location for placement of a second and third camera.

Additional information may be considered for placement of additional cameras 20. For example, a second camera 20e and third camera 20f may be available to record the game. The user may input to the processor 62, e.g., the location of the player's benches 88, 89. For example, as shown in FIG. 6D, each of the second and third cameras 20e, 20f may be placed on an opposite side of the field from the benches 88, 89. The second camera 20e may be placed opposite the bench 88, and the third camera 20f may be placed opposite the bench 89.

In some cases, absolute field location, for example, based on a global position system (GPS), may be used. For example, a user may indicate, via the user interface 64, that the user would like to record a sports event such as a football game. The user may further input, via the user interface 64, one or more coordinates related to a football field where the game will be played, e.g., the location of one or more of the corners of the field. Based on the location of the corner and the known dimensions of the football field, the processor 62 may determine recommended GPS coordinates for the location of one or more cameras 20 to be used for recording the football game.

In some cases, fields may be located in an area without access to GPS data, such as indoors. In such cases, laser measuring devices may be used to calculate distances from cameras to the field and calculate optimal camera operator locations.

Tracking Location and Motion of Players and Objects

The media studio 12 processor 62 may be programmed to track a particular participant in an event, or to track a particular object. For example, parents may wish for a recording of a sports event to focus on the participation of their child. As another example, the processor 62 may be programmed, for example, to track a basketball being used in a basketball game, such that action near the ball is being captured.

The tracking may be performed via data collectors 17. For example, the player or object to be tracked may be equipped with an RFID or other type of tag. Data collectors 17 may detect the location of the tag relative to the field of play. As discussed above, the processor 62 may have received coordinates of the field of play and a location and range of cameras 20 recording the event. Based on the location of the tag relative to the field and the location and range of the one or more cameras 20, the processor 62 may select a camera 20 and related media input item for inclusion in the media output item.

Additionally or alternatively, the location of the player or object may be determined using known image recognition techniques. The processor 62 may be taught to identify the player or object to be tracked and display a media input item including the player or object.

Based on tracking motion of the player or object, the processor 62 may further be programmed to anticipate where the player or object is going. For example, when tracking a basketball in a basketball game, the processor 62 may detect when the ball is moving from one side of the basketball court toward the other side and predict when the basketball will appear in the range of a camera 20. The processor 62 may select the media input item to be displayed based on where the processor 62 predicts that the ball will be.

Based on the motion and location data, the processor 62 may further be programmed to determine levels of motion within different locations in the field of play. For example, based on a predetermined rule, an overall level of motion for each location may be determined. Further, based on the determined overall levels of motion, the processor 62 may determine, e.g., one or more locations with an overall motion level above a predetermined level or a location with a highest relative overall motion level.

For example, the processor 62 may receive motion data from one or more players in a game. The processor 62 may be programmed, e.g., to sum all of the motion of all of the players appearing respectively in each of several locations in the playing field for a particular period of time. Motion may be defined as the total displacement for each of the players during the period of time. The overall level of motion may be determined as the sum of the motion of all of the players for each location may be compared to a predetermined threshold (for example, a total number of meters of displacement during the time period within the location). Media input items (from cameras 20) including the locations with overall motion levels above the predetermined threshold may be included in a media output item.

Additionally or alternatively, a location with a highest relative overall level of motion may be determined. An input item including the location with the highest relative overall motion may be included in the media output item.

Accelerated Playback after Pause (Catch-Up Feature)

During the viewing of an event, for example, a sports event, a viewer may choose to pause the display for a period of time. When the viewer is ready to resume watching the event, the viewer may wish to be brought up-to-date on exciting moments that occurred during the pause. A computing device, which may be associated with a viewer 22, another media device 16, the media studio 12, the server 28, etc., may be programmed to identify and display the exciting moments, while skipping over less exciting periods of the event.

The computing device may identify segments of the event and develop one or more excitement ratings for each segment. As described above with regard to excitement levels, the computing device may receive data indicating an excitement level for each segment. A nonlimiting list of data that may be considered in determining the excitement level includes biometric data associated with one or more camera operators; sound level data indicating when the audience is cheering or screaming; image data indicating quick movement or, e.g., that a score has occurred in the game; excited facial expressions in audience image data; quick movement of a camera 20 indicating that the camera 20 is following action in the game; input from a camera operator (e.g., depressing a highlights button) during exciting moments; an increase in social media activity related to the event; etc.

Based on the data, one or more rules may be constructed to determine a level of excitement associated with each segment of the event.

For example, segments including a score, as determined, e.g., from image data, may be awarded a maximum level of 100. An excitement level for other periods may be determined based on a combination of a level of sound and biometric data from the camera operator. Each segment may, according to this example, be assigned an excitement level between 0 and 100.

Following the pause, when the viewer activates the catch-up feature, the computing device may display, e.g., chronologically, the segments with an excitement level above a threshold. In order to provide context, the computing device may display segments including a first predetermined period of time prior to, and/or segments including a second predetermined period of time after, the segments that are above the threshold. The first and second predetermined time periods may be, for example, 10 seconds.

The threshold may be a default threshold, for example, an excitement level of 70 or higher. Alternatively, the viewer may specify an excitement level threshold for segments to be watched during the catch-up mode. As another alternative, the viewer may, e.g., specify how long the catch-up period should last. Based on a length of a catch-up period provided by the viewer, the computing device may calculate the excitement level threshold that generates the appropriate amount of playback material. The computing device may then display, chronologically, all of the segments with an excitement level above the calculated threshold.

Creating a Highlights Media Item

The media studio 12 processor 62 may be programmed to, during the recording of an event, generate a highlights media output item. The highlights media output item may include, e.g., only exciting segments during the event. The highlights media output item may be, e.g., stored in a storage device 23 or transmitted to the server 28 for later use.

As described above, with regard to the catch-up feature, a media item (recording of an event) may be divided into one or more segments, each segment representing a period of time. An excitement level may be assigned to each segment. Segments with an excitement level above a predetermined threshold may be included in the highlights media output item. As another example, the processor 62 may be programmed to generate a highlights media item to capture scoring drives/plays. Based on analysis of the game being recorded, the media studio 12 processor 62 may identify scoring drives and/or plays. The processor 62 can create a highlights media item which includes the scoring drive/play. The highlights media item may include, e.g., a predetermined period before and after the scoring drive/play. The additional content before and after the scoring drive/play may provide context to a user, allowing the user to differentiate each highlight segment. A highlight media item may be based on an individual game, multiple games happening on a same day, multiple games played by a particular team during a season, etc.

Note that, in addition to excitement level, other factors may be used in creating a highlights media output item. As an example, the highlights media output item could feature views that include a particular player.

Generating Replays for Peak Moments of an Event

The media studio 12 processor 62 may be programmed, during the recording of an event, to identify peak moments that occur during the event. Peak moments may be time periods during the event when an excitement level is above a certain predetermined threshold. The excitement level may be determined as described above.

When a peak moment is identified, the media studio 12 may include one or more replays of the moment in the media output item. The replays may include different views of the peak moment, taken, for example, from different media input items received by the processor 62.

The media input items to be included in the replays may be selected, e.g., according to the location of the camera 20 relative to the action of interest, according to the amount of movement in the respective media input item, based on the presence of a player in the particular media input item, etc.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a media studio including a processor and a memory, the memory storing instructions executable by the processor such that the processor is programmed to:
    receive data indicating a type of event to be recorded;
    receive one or more media input items from one or more respective media devices;
    track progress of the event based on at least a set of rules of the type of event;
    predict a subsequent occurrence based on the progress of the event and the set of rules of the type of event;
    before the subsequent occurrence, generate an aggregated media item that includes one or more of the media input items, the aggregated media item combining the one or more media input items for a common display, wherein the aggregated media item includes one or more respective indications whether the one or more respective media devices will be provided a view of the predicted subsequent occurrence;
    receive one or more commands identifying at least one of the media input items included in the aggregated media item to be included in a media output item;
    generate the media output item based at least in part on the one or more received media input items, and further based at least in part on the data indicating the type of event to be recorded and one or more respective locations of the one or more respective media devices; and
    generate a diagram of a set of one or more respective recommended fixed locations at which to situate the one or more respective media devices during the event based at least on the type of event to be recorded.

2. The system of claim 1, wherein the processor is further programmed to generate the media output item based on the set of rules of the type of event.

3. The system of claim 1, wherein the processor is further programmed to track the progress of the event based at least on receiving user inputs.

4. The system of claim 1, wherein the processor is further programmed to generate the media output item based on the predicted subsequent occurrence.

5. The system of claim 4, wherein the processor is further programmed to generate the media output item to include a first media input item from the one or more media input items based on the location of the media device from which the first media input is received providing the media device a view of the predicted subsequent occurrence.

6. The system of claim 1, wherein the one or more commands are received from one of the one or more media devices.

7. The system of claim 1, wherein the processor is further programmed to generate the set of one or more respective recommended fixed locations for the one or more respective media devices based at least on a number of respective media devices.

8. The system of claim 1, wherein the processor is further programmed to generate the set of one or more respective recommended fixed locations for the one or more respective media devices based at least on one of a time and date of the event and a weather forecast.

9. The system of claim 1, wherein the processor is further programmed to generate the set of one or more respective recommended fixed locations for the one or more respective media devices based at least on characteristics of the one or more media devices.

10. The system of claim 1, wherein the processor is further programmed to generate the set of one or more respective recommended fixed locations for the one or more respective media devices based at least on one of an orientation and absolute location of a field of the event.

11. The system of claim 1, wherein at least one of the media devices is mobile.

12. The system of claim 1, wherein two or more of the media input items are received substantially simultaneously.

13. A method comprising:
   receiving data indicating a type of event to be recorded;
   receiving one or more media input items from one or more respective media devices;
   tracking progress of the event based on at least a set of rules of the type of event;
   predicting a subsequent occurrence based on the progress of the event and the set of rules of the type of event;
   before the subsequent occurrence, generating an aggregated media item that includes one or more of the media input items, the aggregated media item combining the one or more media input items for a common display, wherein the aggregated media item includes one or more respective indications whether the one or more respective media devices will be provided a view of the predicted subsequent occurrence;
   receiving one or more commands identifying at least one of the media input items included in the aggregated media item to be included in a media output item;
   generating the media output item based at least in part on the one or more received media input items, and further based at least in part on the data indicating the type of event to be recorded and one or more respective locations of the one or more respective media devices; and
   generating a diagram of a set of one or more respective recommended fixed locations at which to situate the one or more respective media devices during the event based at least on the type of event to be recorded.

14. The method of claim 13, further comprising generating the media output item based on the set of rules on the type of event.

15. The method of claim 13, wherein the one or more commands are received from one of the one or more media devices.

* * * * *